(12) United States Patent
Zhang et al.

(10) Patent No.: US 12,398,897 B2
(45) Date of Patent: Aug. 26, 2025

(54) AIR PURIFYING FILTER, APPARATUS INCLUDING THE SAME, AND METHODS OF MAKING AND USING THE SAME

(71) Applicant: SICHUAN WURUI TECH. CO., LTD., Chengdu (CN)

(72) Inventors: Qinyong Zhang, Chengdu (CN); Jialin Ren, Chengdu (CN); Xiaobo Lei, Chengdu (CN); Guocai Yuan, Chengdu (CN)

(73) Assignee: SICHUAN WURUI TECH. CO., LTD., Chengdu (CN)

( * ) Notice: Subject to any disclaimer, the term of this patent is extended or adjusted under 35 U.S.C. 154(b) by 0 days.

(21) Appl. No.: 17/762,684

(22) PCT Filed: Mar. 19, 2022

(86) PCT No.: PCT/CN2022/081851
§ 371 (c)(1),
(2) Date: Mar. 22, 2022

(87) PCT Pub. No.: WO2023/178460
PCT Pub. Date: Sep. 28, 2023

(65) Prior Publication Data
US 2024/0053036 A1   Feb. 15, 2024

(51) Int. Cl.
*F24F 13/20* (2006.01)
*F24F 8/108* (2021.01)
*F24F 8/80* (2021.01)

(52) U.S. Cl.
CPC ............... *F24F 8/80* (2021.01); *F24F 8/108* (2021.01); *F24F 13/20* (2013.01)

(58) Field of Classification Search
CPC .... F24F 8/80; F24F 8/108; F24F 13/20; F24F 2003/008; F24F 3/16; F24F 3/163;
(Continued)

(56) References Cited

U.S. PATENT DOCUMENTS 3,215,616 A * 11/1965 Spielman .............. C01B 13/115
  422/186.07
7,083,663 B2 * 8/2006 Shih ....................... B01D 46/84
  422/4
(Continued)

FOREIGN PATENT DOCUMENTS

| CN | 2071980 U | * | 2/1991 | ............ B01D 46/08 |
| CN | 111974092 A | * | 11/2020 | ............ B01D 39/20 |
| CN | 112221277 A | | 1/2021 | |

OTHER PUBLICATIONS

Feng, Nanshan, CN111974092 Translation.pdf, "Air filter screen structure", Nov. 2020, pp. 1-9.*
(Continued)

*Primary Examiner* — Avinash A Savani
*Assistant Examiner* — Ryan L Faulkner
(74) *Attorney, Agent, or Firm* — CENTRAL CALIFORNIA IP GROUP, P.C.; Andrew D. Fortney

(57) ABSTRACT

A heatable air filter is disclosed. The air filter may be baffleless, and generally includes an outer frame and a filter assembly therein. The outer frame and the filter assembly are fixed together with a high-temperature sealant/adhesive. The filter assembly includes a filter medium, a heating element, and one or more card combs. The heating element receives electrical power or current through electrodes that pass through and extend externally from the outer frame. The heating element can heat the entire filter medium using electricity (e.g., through the electrodes), ensuring thorough and substantially complete deactivation of biological contaminants, dryness of the filter medium during use, and an improved service life.

20 Claims, 6 Drawing Sheets

(58) Field of Classification Search
CPC .... F24F 3/167; F24F 8/10; F24F 11/39; F24F 13/085
USPC .................................................. 454/251, 158
See application file for complete search history.

(56) References Cited

U.S. PATENT DOCUMENTS

2021/0339183 A1  11/2021  Hourani et al.
2021/0339184 A1  11/2021  Hourani et al.

OTHER PUBLICATIONS

Baozhu, Wang, CN2071980 translation.pdf, "Stand type air filter", Feb. 1991, pp. 1-4.*

* cited by examiner

AIR PURIFYING FILTER, APPARATUS INCLUDING THE SAME, AND METHODS OF MAKING AND USING THE SAME

FIELD OF THE INVENTION

The present invention generally relates to the field of air purification, in particular to. More specifically, embodiments of the present invention pertain to a heat-based air purifier, a filter therefor, and methods for making and using the same.

DISCUSSION OF THE BACKGROUND

At present, the problems of air pollution and the SARS-CoV-2 pandemic have increased the market demand for air purifiers. In order to improve the existing living and working environment, people began to use air purifiers to improve air quality.

Previous air purifiers use adsorption technologies such as physical adsorption, negative or positive ion adsorption, photocatalyst technology, superstructure photomineralization, high-efficiency particulate air (HEPA) filtration, and electrostatic dust collection. Among them, HEPA filtration is the most popular technology used in air purification, which can effectively adsorb suspended particles in the air. The filter medium of the purifier absorbs a large number of suspended particles after long-term use, which affects the purification efficiency and increases the power consumption in powered purifiers. In humid areas, the filter medium may also be affected by growth of bacteria, molds and viruses due to the increase in humidity.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention provides a heatable air purifier and a filter unit therefor, which connects electrodes to a power supply to heat the filter, which is safe to use and simple to install, and which has a low cost. The filter medium is fixed (e.g., to a frame or support) with a high-temperature glue, and the filter unit is easy to fasten (e.g., in place in a heat-based air purifier), has a lower air flow resistance than prior heatable filters, and has a shorter lead time (e.g., for manufacturing).

Embodiments of the present invention relate to a heatable filter unit for an air purifier, an air purifier containing the same, and methods of purifying air using the filter unit and/or air purifier and for manufacturing the filter unit and the air purifier. The air filter generally comprises an outer frame; at least two electrodes passing through the outer frame; a filter medium in the outer frame; and a heating element passing through the filter medium and electrically connected to the electrodes. In some embodiments, the air filter is baffleless. The outer frame of the air filter (and thus, the air filter itself) may have a cuboid, cylindrical or other shape (e.g., an L-shape, U-shape, V-shape or "W-like" shape, composed of three or more cuboid filters, connected in series and/or in parallel). The cuboid air filter may have a length of 10~10000 mm, a width of 10~10000 mm, and/or a depth or thickness of 10~350 mm, and the cylindrical air filter may have an internal diameter of 50~1000 mm, a wall thickness of 10~350 mm, and a length or height of 20~1000 mm.

In general, the heating element comprises an electrically conductive material, covered with an insulating material. For example, the heating element may comprise a metal wire or mesh, and the insulating material may comprise a polyurethane, a polyesterimide, a polyamide, or a combination thereof.

The filter medium advantageously comprises a plurality of folds, and the heating element may be positioned between adjacent folded sections of the filter medium. Because the air filter is heatable, the filter medium advantageously comprises fiberglass (e.g., a fiberglass filtering sheet). In some embodiments, the air filter further comprises a comb support in contact with the filter medium, configured to mechanically support the filter medium. The comb support may comprise a heat-resistant material, such as a thermally-resistant plastic. The comb support comprises a spine substantially outside the filter medium (e.g., with fingers or teeth having unsecured ends that may extend into spaces between folded layers of the filter medium), and may surround each of the folds on one side or edge of the filter medium. The air filter advantageously comprises a plurality of the comb supports on both the one side or edge of the filter medium and on an opposite side or edge of the filter medium.

In some embodiments, the air filter further comprises an adhesive or sealant on a plurality or (e.g., all) inner surfaces of the outer frame, configured to secure (i) the filter medium to the outer frame and (ii) a position of the heating element positioned between many or all folds of the filter medium. The adhesive or sealant may comprise a thermally-resistant silicone or an epoxy.

The present air purifier generally comprises those that include the present air filter, or that embody one or more of the inventive concepts disclosed herein. For example, the air purifier may comprise the present air filter, a controller, and a power supply conduit in electrical communication with the controller and/or the electrodes. The controller is configured to provide power to and control heating of the heating element. Further embodiments may include an electrical current or power supply circuit configured to supply and/or control the electrical current or power supplied to the heater element, a fan or pump, a temperature sensor, a display element (e.g., a display screen, one or more control buttons), and/or a plurality of wheels or casters (e.g., three or more wheels or casters), which may be fixed to the underside of the housing using a bearing.

For example, in some embodiments, the air purifier may further comprise a fan or pump configured to draw air through the filter medium. Alternatively or additionally, the air purifier may further comprise a housing enclosing the air filter, the controller, at least part of the power supply conduit, and optionally, the fan or pump. Optionally, when the air purifier comprises the housing, the housing includes one or more air inlets or intake vents and one or more outlets or exhaust vents. The air filter may be positioned in the housing to receive air brought into the housing through the air inlet(s) or intake vent(s), and the fan or pump may be positioned in the housing to force or deliver the filtered air through the outlet(s) or exhaust vent(s).

The temperature sensor may be in or on the outer frame of the air filter. When present, the temperature sensor is communicatively coupled to the controller, and is configured to provide temperature information to the controller.

In some embodiments, the air purifier is a mobile air purifier, further comprising the housing, three or more wheels or casters affixed to the housing, and one or more handles on or in the housing. The wheels or casters are configured to enable wheeled movement of the housing.

The method of purifying air generally comprises heating a heating element passing through a filter medium in an air filter, and drawing air through the heated filter medium. As described herein, the air filter further comprises (i) an outer frame encompassing and supporting the heating element and the filter medium, and (ii) at least two electrodes passing through the outer frame. The heating element is electrically connected to the electrodes. In some embodiments, the method of purifying air further comprises (i) determining a temperature in the air filter, and (ii) controlling an amount of energy (e.g., electrical current or power) provided to the heating element to maintain the temperature in the air filter at or near a target temperature (e.g., in the range of 56-300° C., or any temperature or range of temperatures therein).

Another aspect of the present invention relates to a method of making a heatable air filter, comprising placing a heating element in a filter medium; placing at least two electrodes through an outer frame; electrically connecting the heating element to the electrodes; and affixing the filter medium and/or the heating element to the outer frame using an adhesive or sealant.

The purposes of the present invention include improving the deficiencies existing in the prior art, and providing a baffleless heating air filter, which can realize a fast and safe heating function while filtering and purifying air, keep the filter dry, and improve the service life. The present air filter is relatively simple and easy to make and maintain or replace.

In the present filter unit, the metal mesh that was used to heat the filter medium (and thus kill or deactivate any nearby living or organic contaminants, such as bacteria, molds, fungus and viruses) in prior heat-based air purifiers is replaced with an insulated metal wire (e.g., a conductive metal wire wrapped in an insulating coating), which is safer and which can avoid the use of or need for a temperature detector in the filter unit (see, e.g., U.S. Pat. Appl. Publ. Nos. 2021/0339183 and 2021/0339184). The air purifier in these U.S. patent publications protects the heatable metal foam, metal mesh, and other component(s) (e.g., ultraviolet light source) between the air outlet and the filter, so that when the air flows through these heatable metal materials, it kills or deactivates the biological contaminants thereon, and possibly therein. The pores of such metal foams have a size (e.g., diameter) on the order of millimeters, but the bacteria and other biological contaminants have a size the order of micrometers or even sub-micrometers, so the decontamination effects may be less than ideal. Furthermore, the filter medium (e.g., fiberglass) can only be effectively heated by receiving heat radiation from the nearby (e.g., within a couple of millimeters) heatable metal material in principle. But in these U.S. patent publications, as there is only one layer of heatable metal material positioned at or near the outlet surface of the air filter, only the neighboring filter medium (e.g., within a couple of millimeters) can be effectively heated, while the filter medium that is farther away from the heatable metal layer may remain under the threshold temperature for killing or deactivating biological contaminants. As a result, after a certain period of filtering, the biological contaminants blocked by the filter medium may still be active or alive, which makes the filter or the air purifier to be a potential source of contaminants (e.g., virus). In the present filter unit, the heatable material comprises wire mesh or wire, embedded in the filter and positioned close to (e.g., within a few millimeters of) every fold of the filter medium, which can heat all of the filter medium effectively to certain threshold temperature for killing or deactivating the biological contaminants. The pores of the filter medium may be much smaller (from tenths of a micron to submicron; e.g., 0.2-0.9 µm) than those of metal mesh or foam, and the interception efficiency of such filter media for particles having a size of 0.3 microns or greater can be from about 50% to 99.9999%. Such filter media can intercept biological contaminants in the air to the maximum extent, and then kill the intercepted biological contaminants thermally (e.g., by heating the filter medium). These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "connected to," "coupled with," "coupled to," and "in communication with," are generally used interchangeably herein, but these terms are generally given their art-recognized meanings. Wherever one such term is used, it also encompasses the other terms. Also, for convenience and simplicity, the terms "part," "portion," and "section" may be used interchangeably herein, but are generally given their art-recognized meanings.

The invention, in its various aspects, will be explained in greater detail below with regard to exemplary embodiments.

An Exemplary Air Filter

Figure 1:
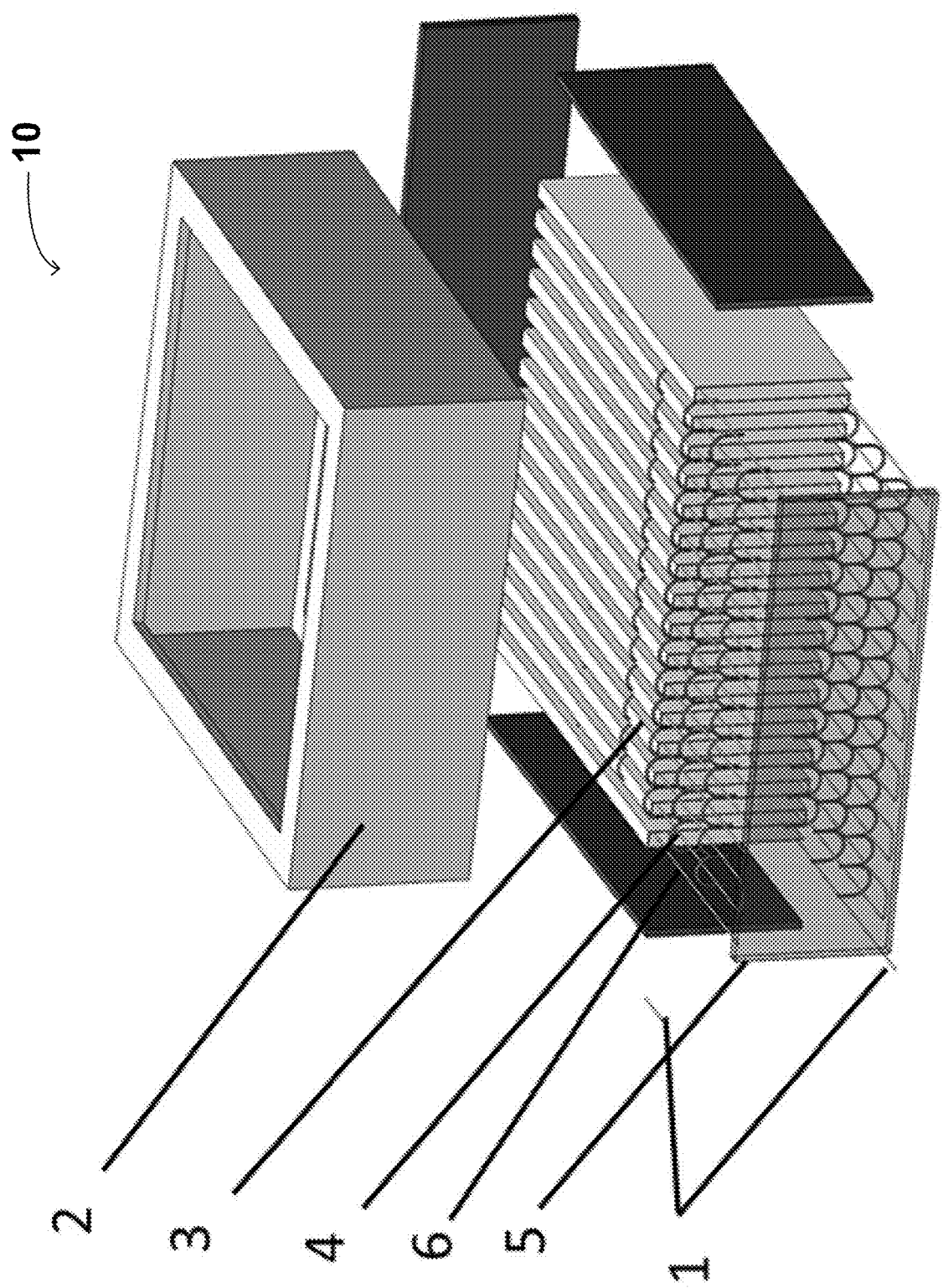
FIG. 1 is an exploded view of an exemplary air filter unit according to one or more embodiments of the present invention.
Figure 2:
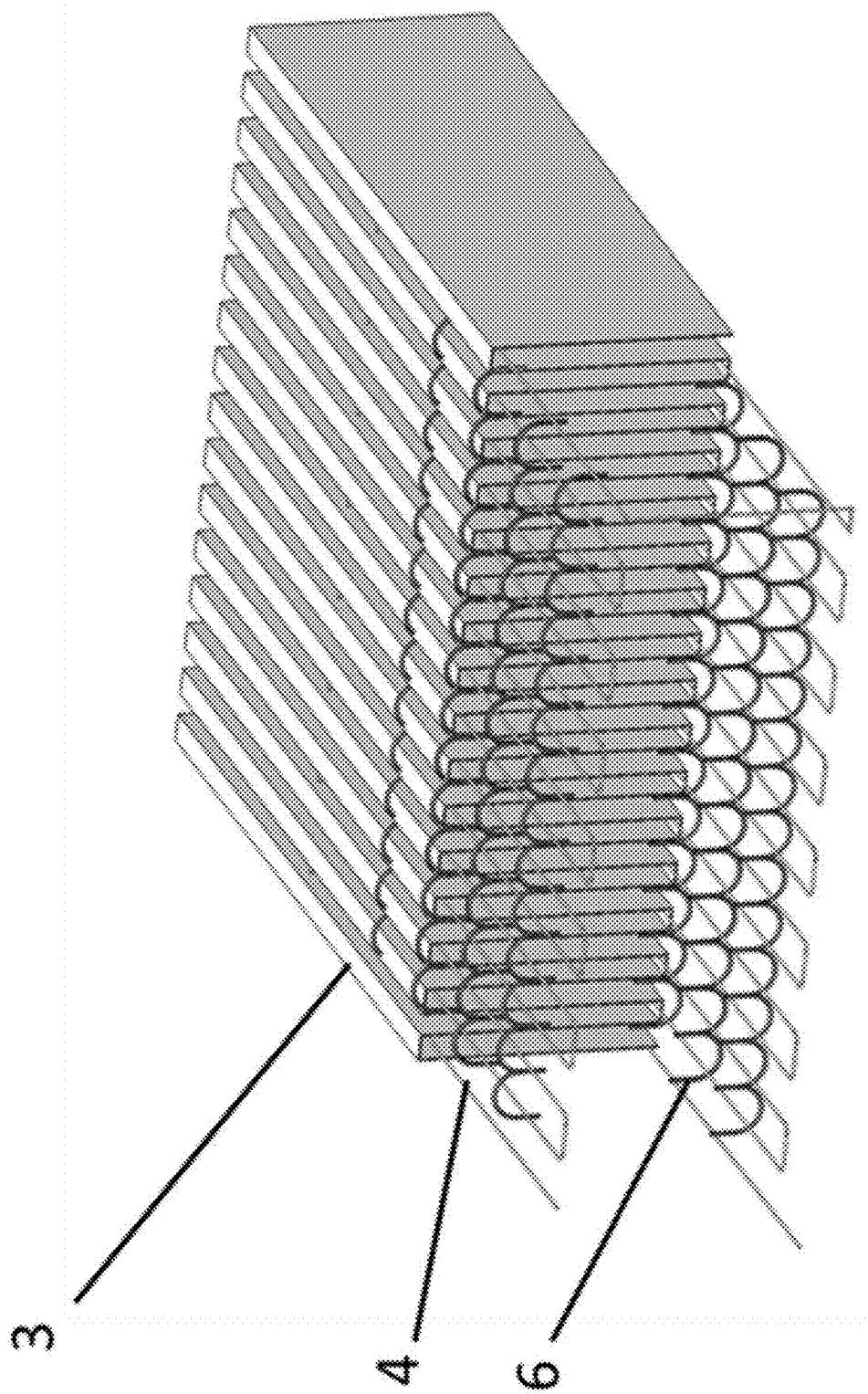
FIG. 2 is an expanded view showing an exemplary heating mechanism in an exemplary filter medium according to one or more embodiments of the present invention.
Figure 3:
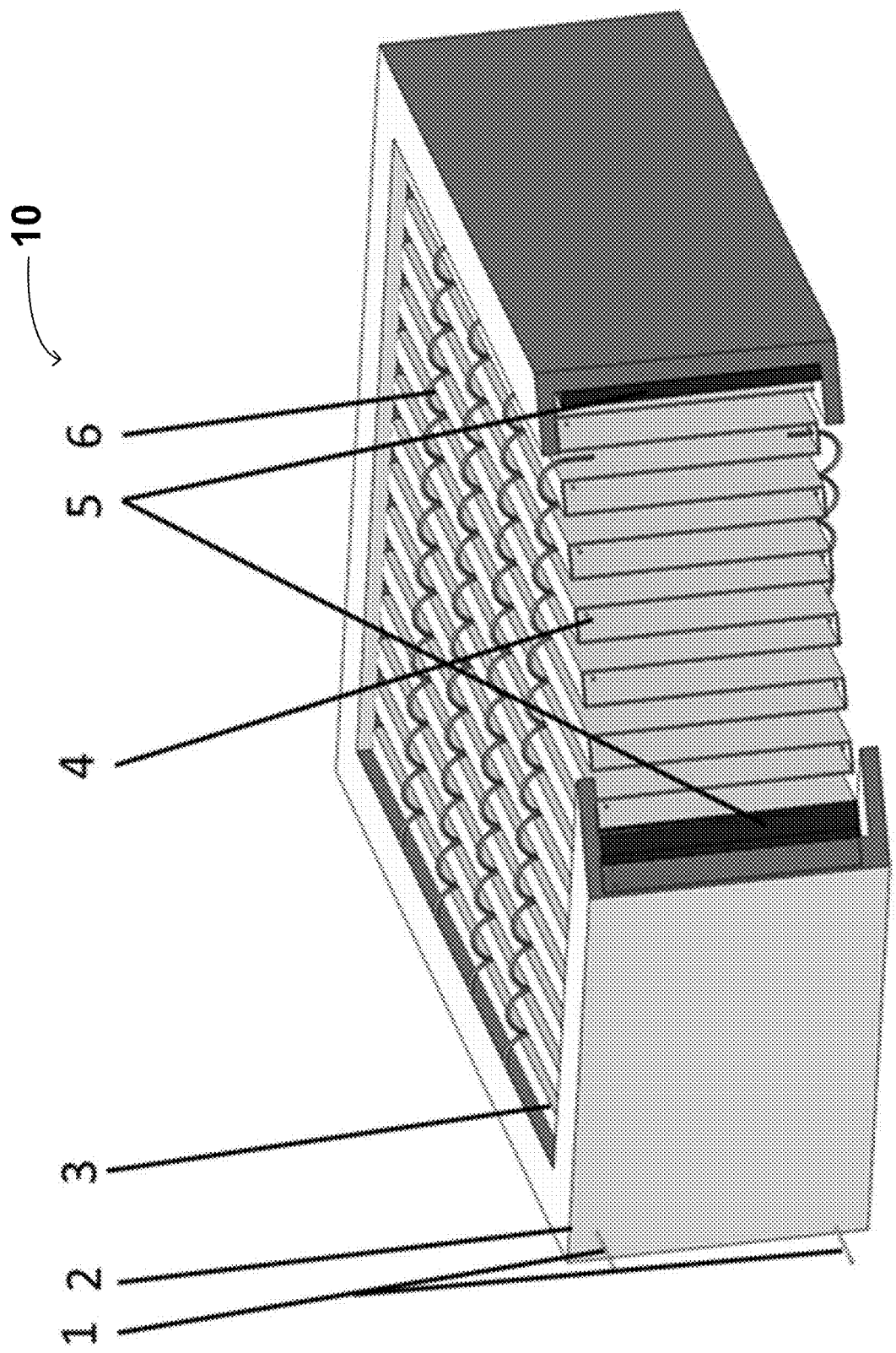
FIG. 3 is a schematic diagram showing the essentially complete filter unit of FIG. 1, according to one or more embodiments of the present invention.

FIG. 1 is an exploded schematic diagram showing an exemplary structure of an air filter unit 10, and FIG. 2 is an expanded schematic structural diagram of an exemplary heating mechanism in exemplary filter medium, according to one or more embodiments of the present invention. FIG. 3 shows the exemplary air filter unit 10 in assembled form, with a corner cut away to view the internal structure of the air filter unit 10. The exemplary air filter unit 10 includes electrodes 1, an outer frame 2, filter medium 3, a heating element 4, high-temperature resistant glue 5, and a card (or filter medium) comb 6.

The embodiment(s) of FIGS. 1-2 show an exemplary air filter, which includes an outer frame 2 that encloses and/or supports a filter channel. The outer frame 2 preferably comprises aluminum, an aluminum alloy, or a high-temperature plastic. The high-temperature plastic may have a glass transition temperature above 160° C., and may comprise a polycarbonate, a polyarylate, a polyethylenimine (PEI), a polyimide (including a thermoplastic polyimide, or TPI), a polysulfone, or a high-density polyethylene (HDPE) having such a glass transition temperature.

The size of the outer frame 2 can be determined according to actual needs. As an example, the dimensions of the outer frame 2 may be 300 mm×300 mm×100 mm, although the outer frame 2 may have a length of 10-10000 mm, a width of 10-10000 mm, and a depth or thickness of 10-350 mm, or any length, width or thickness or range of lengths, widths or thicknesses within these ranges, although the invention is not limited thereto. The filter medium 3 may have dimensions similar to or less than those of the outer frame 2. For example, the filter medium 3 may have dimensions equal to those of the outer frame 2, minus two thicknesses of the material for the outer frame 2 plus 1-2 thicknesses of the sealant or adhesive 5.

In the embodiment(s) shown in FIGS. 1-2, a fiberglass filter medium 3 is included transversely in the outer frame 2 to intercept suspended particles in the air, so as to achieve the purpose of purifying the air. The fiberglass filter medium 3 may comprise H13 high-efficiency fiberglass filter media, but filter media of any type and material that can withstand the heat used to kill or deactivate biological contaminants can be selected. Other heat-tolerant filter media may also be suitable, such as fire-retardant polyester and polyesters that are tolerant to a temperature of at least 90° C. Such air purification filter media are well-known.

Electrodes 1 are used to connect the heating element 4 to an external power supply (not shown in FIGS. 1-2). In the embodiment(s) shown in FIGS. 1-2, the filter unit 10 further includes a heater 4. The heating element 4 is configured through the folds inside the filter medium 3, and generates heat (e.g., resistively) when an electrical current is passed through it. In some embodiments, the heating element 4 comprises a metal wire enwrapped with insulating coating. Alternatively, the heating element 4 may comprise a mesh of metal wires coated with insulation. The mesh may have as few as three wires along its width (e.g., along the thickness or height direction of the filter unit), but may have nearly any number of wires along its length (i.e., aligned along the longest dimension of the mesh). The metal wire or mesh may have a resistivity of $10^{-9}$-$10^{-5}$ Ohmm (i.e., $\Omega \cdot m$), and may comprise copper and/or copper alloy, aluminum and/or aluminum alloy, nickel and/or nickel alloy, zinc, iron and/or an alloy thereof (e.g., steel).

In order to increase the area of the filter medium 3 through which air passes and to improve the filtration efficiency, the fiberglass medium 3 may have a continuous right-angle bending or folding structure, as shown in FIGS. 1-2. However, bent or folded structures with appropriate cross-sectional shapes can be made as needed or desired.

In the embodiments shown in FIGS. 1-2, the heating element 4 may comprise a copper wire coated with polyesterimide (PEI). The coated or uncoated wire may have a diameter of 0.1-1.0 mm, or any diameter in this range (e.g., 0.4 mm). The length and diameter of the heating element 4 may be selected or adjusted according to target temperature and heating rate. Although FIGS. 1-2 show that the heating element 4 is a single wire with several folds or turns, and is configured in the space at every fold (or every other fold) of the filter medium at both inlet and outlet of the filter unit 10. However, other embodiments are not limited to this configuration. For example, the heating element 4 can compose a plurality of (e.g., several or many) wires connected together serially or in parallel through special designed electrodes 1 (e.g., running along the inner surface of the frame 2). Also, for the purpose of uniformly heating the filter medium 3 while saving energy as much as possible, the heating element 4 may have only one layer, configured in the middle of the filter 10 (e.g., when the size of the filter medium 3 in the air flow direction is sufficiently small), or with additional, similarly configured layers at both the inlet and the outlet of the filter unit 10 (e.g., when the filter medium 3 is sufficiently thick). The heating element 4 can also be configured in every other fold of the filter medium 3, and is not limited to the configuration in every fold as shown in FIGS. 1-2. When the coated wire is heated, the heating process is safer because of its insulating coating. The heating element can be made of any conductive material, and its insulating part can be made of any insulating material.

For better seal of the filter 10, a high-temperature-resistant sealant and/or adhesive 5 is used. The sealant and/or adhesive 5 may prevent the unfiltered air from flowing through the space between the outer frame 2 and the filter medium 3. In the embodiment(s) of FIGS. 1-2, at least the outer frame 2 may be fixed together with parts of the heating element 4 and the filter medium 3. As an example, as shown more clearly in FIG. 1, the high-temperature-resistant sealant and/or adhesive 5 fixes at least part of the heating element 4 that may be outside the filter medium 3 and/or in contact with the outer frame 2 to the inner surface of the outer frame 2. The sealant and/or adhesive 5 also fixes the contact parts of the filter medium 3 to the outer frame 2. For example, the sealant and/or adhesive 5 may comprise a high-temperature silicone, an epoxy sealant and/or adhesive, a high-temperature acrylic adhesive, etc.

In currently available air purification filters, the filter medium is generally fixed to the frame with a hot melt adhesive. Hot melt adhesives have insufficient temperature resistance (e.g., they can have a melting point below 80° C. and an even lower softening temperature), and thus the filter medium 3 cannot be safely or reliably heated to a temperature sufficient to effectively or reliably kill or deactivate biological contaminants trapped by or adhered to the filter medium 3.

The filter medium 3 of the present filter 10 is resistant to temperatures that range from 56° C.-300° C., and may have an air particle blocking or filtering efficiency that is high, medium, or primary. In air filters, in order to block small-size dust or particles in the air when it passes through the filter, the holes or pores in the filter medium should be relatively small. However, the smaller the holes or pores, the greater the air resistance. Therefore, high-efficiency filters are advantageously folded, to increase the air flow area and achieve a balance between efficiency (particle removal) and air flow resistance (energy consumption). Most filter media made of polymeric materials are not sufficiently resistant to high temperature. Filter media made of fiberglass are resistant to physical deformation and chemical breakdown up to about 200° C. or higher in some cases. However, fiberglass filter media generally do not have sufficient stiffness to withstand the pressure or force of the air flow thereon, and should be fixed in place or supported with a relatively stiff, strong support, such as the card combs 6.

In the embodiment(s) of FIGS. 1-2, the card combs 6 comprise or are made of high-temperature-resistant plastic, and the card combs 6 are placed at or over the bends of the fiberglass medium so that the spine is substantially outside the filter medium. Alternatively, the card combs 6 may comprise a metal wire, optionally coated with a thermally-resistant plastic. As shown, three combs 6 are configured on each of the front and back sides of the filter medium 3 to serve as corrugation supports. The card comb 6 functions as a frame or holder for the filter medium 3, and forms the filter medium 3 into a curved and/or folded (e.g., corrugated) shape. When the filter medium 3 is deformable under the conditions of use, in the absence of the card comb 6, it may deform or compress (e.g., to form a stacked structure) when the force of the air passing through the filter medium 3 is sufficiently high. This increases the air resistance of the filter.

In the embodiment(s) of FIGS. 1-2, a power source is connected to the electrodes 1 to provide electrical power to the heating element 4, typically using a power supply conduit (such as a power cord or wire capable of carrying electrical power from an external power supply to the electrodes 1), according to design criteria. When the outer frame 2 comprises or is made of a conductive metal such as an aluminum alloy, an insulating jacket, sleeve or gasket should be between the electrodes 1 and the part of the outer frame 2 that would otherwise contact the electrodes 1. When the outer frame 2 comprises or is made of a non-conductive material such as a plastic, it is not necessary to add the insulating sleeve or gasket. The position of the electrodes 1 can be anywhere on the outer frame 2 as desired.

The heating element 4 passes through the filter medium 3 between adjacent sections or layers of the filter medium 3, generally under and/or over a fold in the filter medium 3 or a folded portion of the filter medium 3. As shown in FIG. 2, one length of heater element 4 passes through the space between adjacent layers of the filter medium 3 near the fold or folded portion, thus being placed in alternative (i.e., every other) space between adjacent layers, and the heating element 4 on one side of the filter medium 3 is in spaces adjacent to the spaces containing the heating element 4 on the opposite side of the filter medium 3. In alternative embodiments, a single length of heating element 4 may pass through the space between adjacent layers of the filter medium 3 (e.g., in the center along the thickness of the filter, or at the side of the filter receiving inflowing air), or multiple lengths of heating element 4 may be spaced throughout the space between adjacent layers of the filter medium 3. In addition, the heating element 4 may be positioned in every space between adjacent layers of the filter medium 3. However, the arrangement shown in FIGS. 1-2 ideally balances (1) heating uniformity throughout the filter medium 3 and (2) efficient use of electrical power, and may facilitate the manufacturing process.

The heating element 4 covered with an insulating material may reduce heating efficiency slightly, but it increases user safety greatly. The filter unit 10 as a whole is a consumable item, that may need replacing after a certain length (e.g., period of time) of use. If the user touches the wire (e.g., during replacement of the filter unit 10), the user may receive an electric shock. Experimental results have shown that heating efficiency (i.e., temperature increase per unit of electrical power) is not much lower than with similar or otherwise identical bare (uninsulated) wires. In cases where the rate of heating (i.e., temperature increase) is relatively low, a longer heating time ensures that the target temperature for the filter medium 3 is reached.

When the air passes through the filter unit 10, the particles in it are broadly intercepted by the folded filter medium 3 to realize air filtration. Prior filters, such as those disclosed in U.S. Pat. Appl. Publ. Nos. 2021/0339183 and 2021/0339184, that use a heated metal foam or wire generally include a thin layer (about a few millimeters thick) of heating material outside the filter medium to form a high-temperature state by heat radiation from the heating material to the filter medium. However, such heated metal foam or wire outside the filter medium may not effectively heat the entire filter medium to a desired temperature uniformly (i.e., the filter medium close to the heating material may reach the desired temperature, while that far from the heating material may be relatively unheated), resulting in a relatively low efficiency of killing or deactivating biological contaminants. The present filter unit 10 advantageously heats the entire thickness of the filter medium 3 (e.g., 150-300 mm), so that it is uniformly in a high-temperature state, thereby improving the deactivation of biological contaminants, while at the same consuming less power.

Exemplary Air Purification Devices

Figure 4:
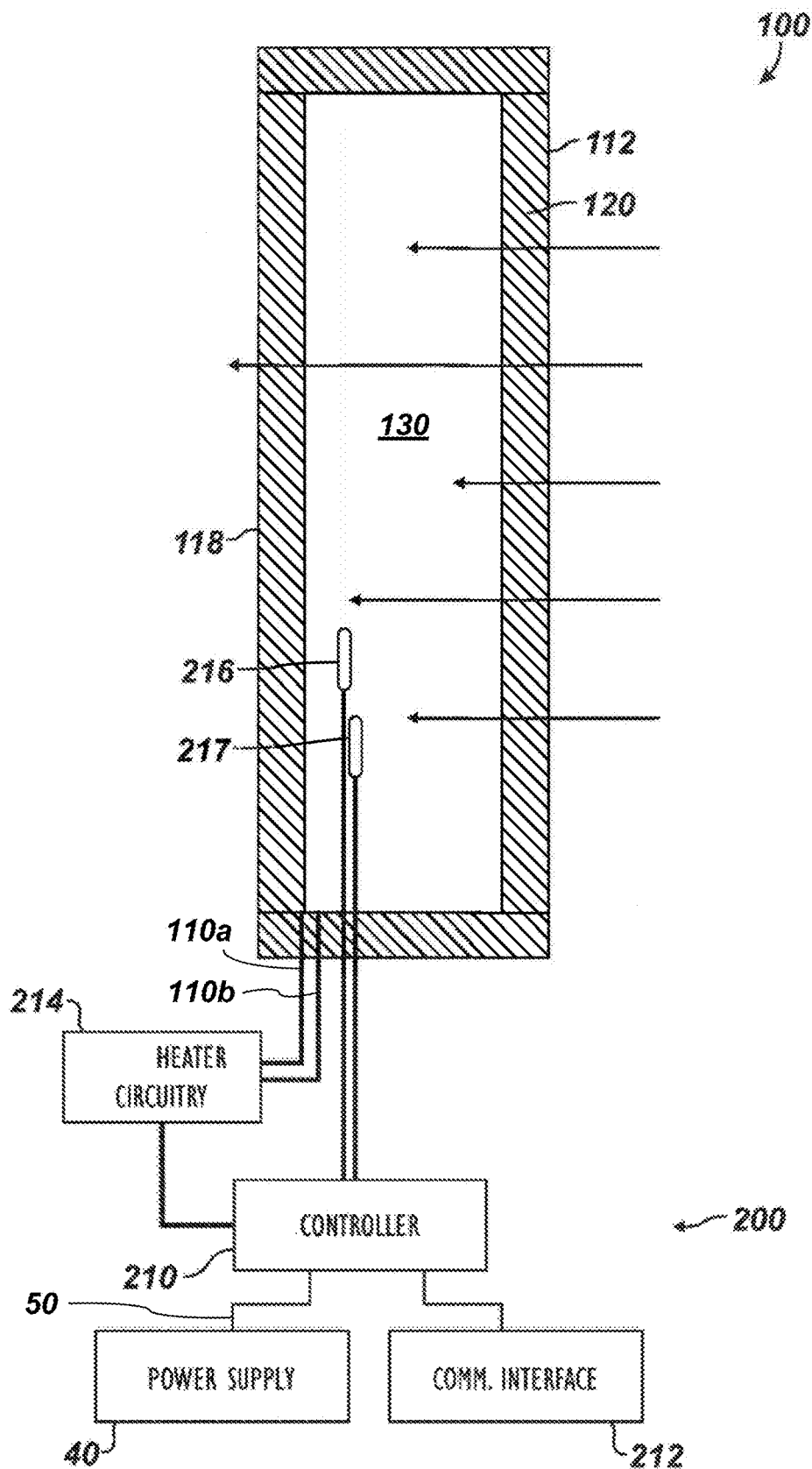
FIG. 4 is a side cross-sectional view of an exemplary air purification device according to one or more embodiments of the present invention.

In another aspect, the present invention concerns an air purification device that includes the exemplary air filter unit 10 of FIG. 3. Referring now to FIG. 4, a side cross-sectional view of an exemplary air purification device 100 is shown.

The frame 120 of the device 100 is shown holding the filter medium 130. The air purification device 100 is used with control circuitry 200 and supplied power 50. For example, the control circuitry 200 includes a controller 210 having appropriate power circuitry and processing circuitry for powering and controlling the air purification device 100. The control circuitry 200 can be connected to a power supply 40, such as available AC power supplies of a facility, a battery, or another power source. Power circuitry of the controller 200 can convert the supplied power to produce DC power and voltage(s), for various applications such as the heater circuitry 214.

The frame 120 holds the filter medium 130 as shown in FIGS. 1 and 3 in a manner allowing air flow from the inlet 112 through the filter medium 130. The heater (not shown, but connected to the electrodes 110*a-b*) is disposed in the filter medium 130 and can be situated at least in part toward the inlet 112 (and, optionally, toward the outlet 118).

The air purification device 100 can include anti-microbial coatings on one or more surfaces to eliminate live bacteria and viruses. For example, the filter medium 130 can have an anti-microbial coating to eliminate pathogens trapped by the filter medium 130, if practical under heating conditions during use.

The controller 200 is in electrical communication with the heater circuitry 214 and the power supply 40. The controller 200 can be a local controller that can include a communication interface 212 to communicate with other devices (e.g., a central air purification or other control system for a building or part or section thereof) and with other components of an air handing system (e.g., a fan or pump for moving air through the filter unit). The controller 200 can receive a signal through the communication interface 212 that informs the controller 200 that a corresponding heating, ventilation, and/or air conditioning (HVAC) system is on or off, which indicates whether air may be flowing or passing through the device 100. The controller 200 can then control the heating of the heater wire based on signals received through the communication interface 212, the control program in the controller 200, and/or user inputs into the controller 200 or a control system sending the signals to the communication interface 212.

The controller 200 is in electrical communication with the heater circuitry 214, which is in turn connected to the heater wire through the electrodes 110*a-b*. At least when air passes through the device 100 (e.g., as drawn by the HVAC system), the controller 200 can control heating the heater using the heater circuitry 214, powered by the power supply 40. The controller 200 and heater circuitry 214 includes any desired or necessary switches, relays, timers, power transformers, etc., to process and/or control the power supplied to the heater circuitry 214 and the heater in the filter medium 130.

The controller 200 may heat the heater in the filter medium 130 when the controller 200 receives a signal indicating that the air purification system (e.g., as controlled by a corresponding HVAC system) is operating. Pre-heating before the system draws air through the filter medium 130 can occur so that a target temperature can be reached before heating (and thus purifying) the air. Pre-heating may be triggered by an advance signal from the system controller (received through the communication interface 212), and may involve intermittent heating of the heater wire to maintain a base or target temperature. Post-heating (e.g., after the air flow through the filter unit ends) may also be beneficial.

To monitor and/or control the temperature in the filter unit, the controller 200 can include one or more sensors 216, 217. For example, the controller 200 can include a temperature sensor 216 in or adjacent to the filter unit (e.g., inside the frame 120 or mounted on an outside surface of the frame 120) and in electrical communication with the controller 200. The temperature sensor 216 is configured to measure the temperature in or associated with the filter medium 130 so that the controller 200 can control the current or voltage to the heating element to reach and maintain a target temperature in the filter medium 130. Alternatively, the controller 200 can functionally measure the voltage and/or current to and/or the resistance of the heating element 4 to monitor the temperature of filter medium indirectly based on prior correspondence data (e.g., between the voltage, current and/or resistance and the temperature in the filter medium 130). Depending on the implementation details and the pathogen(s) to be deactivated, the heater wire can be heated so that the temperature in the filter medium 130 is over 56° C. (130° F.). Research shows that heat at 56° C. or above (e.g., 56-67° C. [133-152° F.] or more) can kill the SARS coronavirus. To ensure such a temperature is reached, the target temperature may be 70° C. or more (e.g., in the range of 70-85° C.).

The controller 200 can be connected to yet another sensor 217, such as a flow sensor to sense, measure or determine the flow rate, velocity, or the like of the air passing through the filter medium 130. The flow rate or velocity detected by the flow sensor 217 may be used by the controller 200 to initiate operation of the device 100 (e.g., if not signaled remotely). Alternatively, the flow rate or velocity detected by the flow sensor 217 may be used by the controller 200 to terminate operation of the device 100 (e.g., if a flow rate or velocity below a threshold value, such as 0.1-1 m/s, is detected). The velocity or flow rate may also be measured by the flow sensor 217 to coordinate a target flow velocity through the device 100 with a target temperature in the filter medium 130 so that effective deactivation of biological contaminants in the air can be conducted while operating the device 100 safely. When the device 100 is integrated with an HVAC system operable at different flow rates, then feedback from the flow sensor 217 can be used to control or indicate the flow rate of air drawn through the device 100.

The purification device 100 may be included in a flame-retardant and flame-resistant filtration system. For example, the device 100 can be placed in a return behind a conventional HVAC grill for return air.

Figure 5:
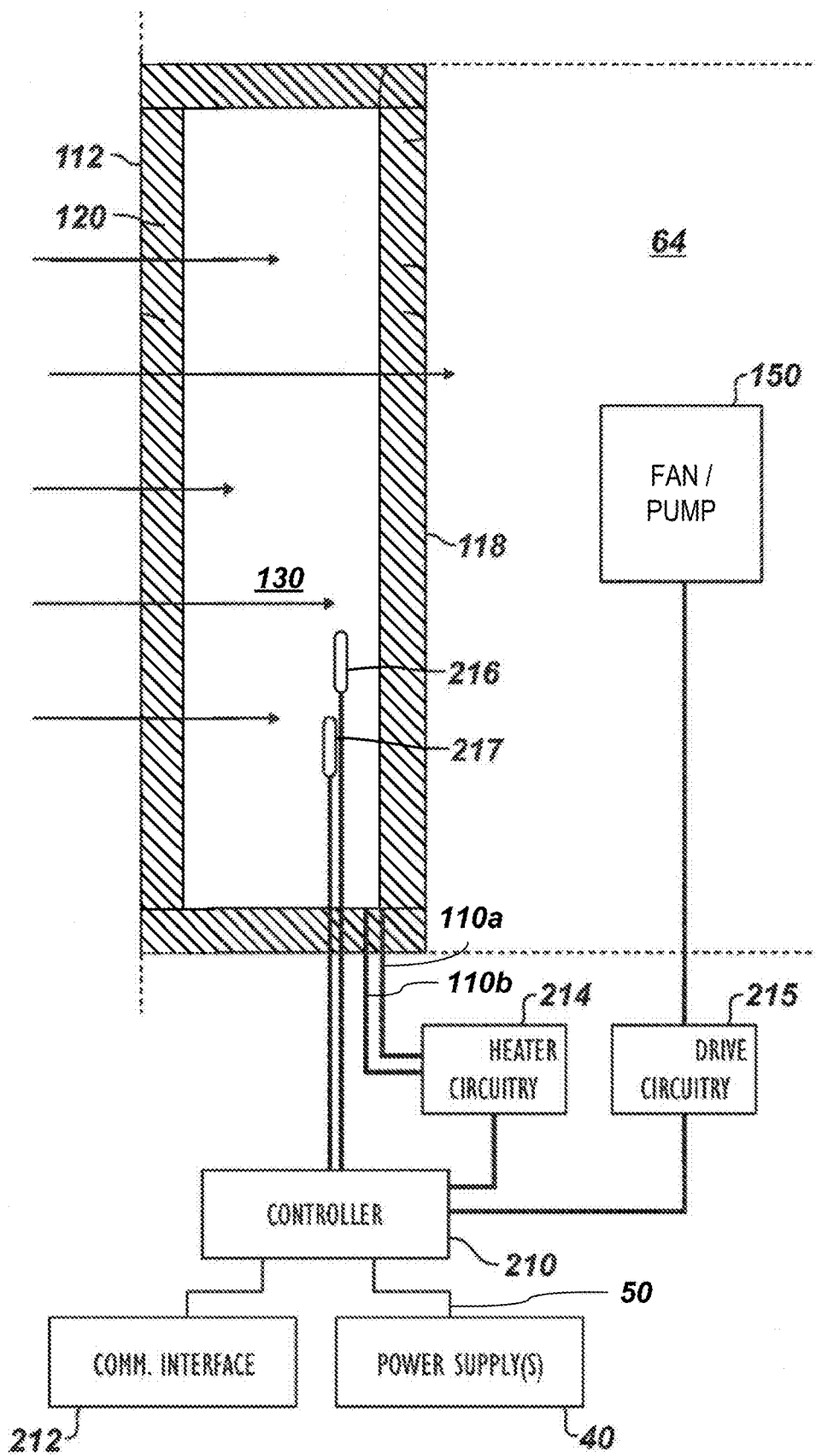
FIG. 5 is a side cross-sectional view of another exemplary air purification device according to one or more embodiments of the present invention.

In further embodiments, the present air purification device may further include a fan or pump configured to pull air through the filter unit. For example, FIG. 5 shows a cross-sectional view of an exemplary air purification device according to one or more embodiments of the present invention. The air purification device of FIG. 5 is essentially the same as that of FIG. 4, except for the addition of a fan or pump 150 and drive circuitry 215.

The controller 200 is in electrical communication with drive circuitry 215, which in turn is electrically connected to the fan or pump 150. To treat the environmental air, the drive circuitry 215 operates the fan or pump 150, which can then move air through the filter medium 130. As shown, the fan or pump 150 may be used to draw air through the filter medium 130 in a manner suitable for filtration arrangements. For example, the fan or pump 150 may be operably connected to (e.g., in fluid communication with) a duct 64 in an HVAC system or a portable air purification unit. Of course, other arrangements of the filter unit and the fan or pump 150 may be acceptable. In some embodiments, the controller 200 may not operate the fan or pump 150 until the heater wire has heated the filter medium 130 to a target temperature.

Figure 6A:
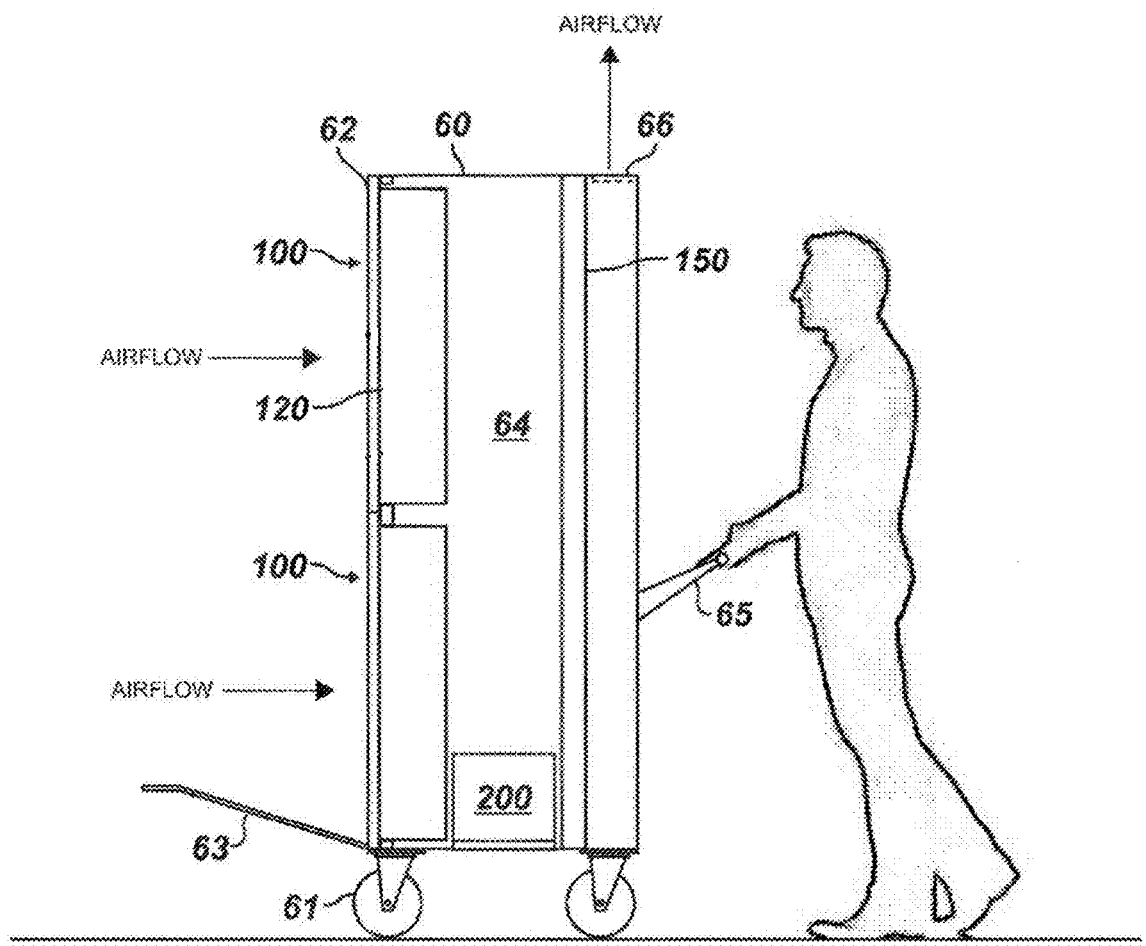
FIG. 6A shows an exemplary mobile air purification device according to one or more embodiments of the present invention.

FIG. 6A shows an exemplary mobile air purification device according to one or more embodiments of the present invention. The mobile air purification device of FIG. 6A includes caster wheels 61 and a tow hitch 63 and/or a handle 65, which allow the mobile device to be placed in a desired location. Although the mobile device as shown is a particular implementation, typical dimensions of the housing 60 of the mobile device may include width of 40 to 150 cm, a height of 60-200 cm, and a depth of 20-100 cm, although the invention is not limited to these dimensions. The dimensions of the filter unit frame(s) 120 can be adapted to the overall dimensions of the housing 60. Typical dimensions for the frame 120 may include a width of 30 to 70 cm, a height of 30-90 cm, and a depth of 10-30 cm, although the invention is not limited to these dimensions.

The housing 60 includes an intake 62 and an exhaust 66. The intake 62 can be an open side of the housing 60 for drawing environmental air across a relatively large surface area, while the exhaust 66 can be a port (opening) in the housing 60, directing treated air into a predetermined area of the environment. The housing 60 has sidewalls enclosing an interior or main plenum 64, for passage of air through the housing, from the intake 62 to the exhaust 66. The fan or pump 150 is secured in the housing 60 between the intake 62 and the exhaust 66, and is operable to draw the air from the environment into the housing 60 through the intake 62 and the filter unit, and exhaust the filtered air back to the environment through the exhaust 66.

Figure 6B:
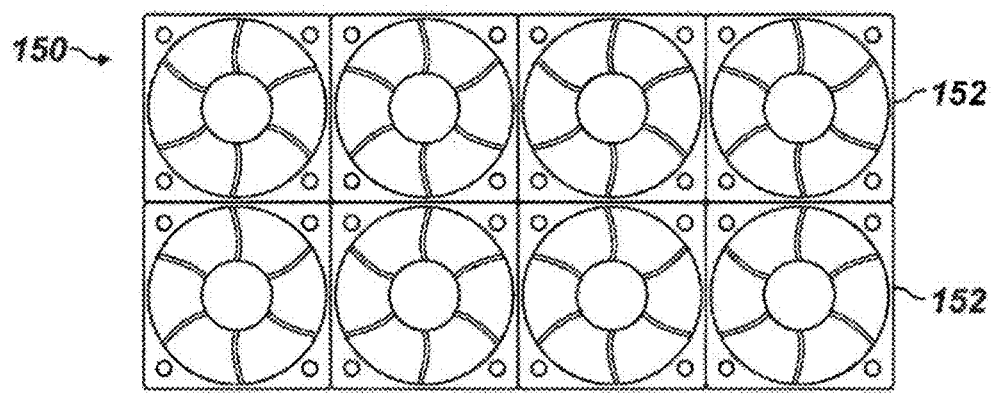
FIG. 6B shows an exemplary fan arrangement suitable for use in the mobile air purification device of FIG. 6A.

FIG. 6B shows an exemplary fan arrangement 150 suitable for use in the mobile air purification device of FIG. 6A. The fan arrangement 150 comprises a plurality of electric fans 152, which may be in an array of rows and columns. Although eight fans 152 are shown in the example of FIG. 6B, the array of fans 152 may include m rows and n columns, where each of m and n is independently an integer of one or more, but at least one of m and n is an integer of two or more. The area dimensions (i.e., height and width) of the fans 152 generally depend on the height and width of the interior or main plenum 64, but in other arrangements (e.g., mounting one or more fans in the sidewall[s] of the housing 60), the area dimensions of the fans 152 are not limited by the dimensions of the interior or main plenum 64. Multiple fans 152 across the surface area of the interior or main plenum 64 of the housing 60 advantageously draw air uniformly through the intake 62, relative to a single fan. Suitable fans 152 for such an arrangement can include electric fans having a single speed or variable speed control, such as conventional cooling fans for cabinet installations, audio visual enclosures, etc.

An Exemplary Method of Purifying Air

A further aspect of the invention relates to a method of purifying air, comprising heating a heating element passing through a filter medium in an air filter, and drawing air through the heated filter medium. The air filter comprises the heating element, the filter medium, an outer frame encompassing and supporting the heating element and the filter medium, and at least two electrodes passing through the outer frame. The heating element is electrically connected to the electrodes. In some embodiments, the method further comprises (i) determining a temperature in the air filter, and (ii) controlling an amount of energy (e.g., electrical power or current) provided to the heating element to maintain the temperature in the air filter at or near a target temperature.

The air filter is as described above. When the target temperature is 56° C. or greater (e.g., 70° C.), biological contaminants in the air drawn through the air filter may be deactivated. The longer the amount of time that the air spends in the air filter at such a target temperature, the greater the likelihood of deactivating biological contaminants. At such temperatures, the air filter also generally remains dry, reducing the likelihood of biological contaminants surviving in or on the air filter.

In many embodiments, the air is drawn through the air filter using a pump or one or more fans, as described herein. The pump or fan(s) may be positioned at one end of a sealed air passage or vent (e.g., a plenum), and the air filter may be at an opposite end of the sealed air passage or vent.

In many embodiments, the method may further comprise controlling the energy supplied to the heating element so that the temperature in the air filter or filter medium is maintained at or near the target temperature, as described herein. Optionally, the method may further comprise controlling the rate at which the air is drawn through the air filter to maintain the temperature in the air filter or filter medium at or near the target temperature. The rate at which the air is drawn through the air filter may be controlled by changing (e.g., increasing or decreasing) or maintaining the rotation rate or speed of the fan(s) or the flow rate (or displacement volume per cycle) of the pump.

An Exemplary Method of Making an Air Purifier Filter Unit

The present invention further relates to method of making a heatable air filter, comprising placing a heating element in a filter medium; placing at least two electrodes through an outer frame of the air filter; electrically connecting the heating element to the electrodes; and affixing the filter medium and the heating element to the outer frame using an adhesive or sealant.

In one or more embodiments, placing a heating element in a filter medium may comprise folding the filter medium into a bent or corrugated (e.g., zig-zag, chevron, alternating, etc.) shape, bending the wire so that first lengths of the wire pass through first spaces between layers or sections of the bent or corrugated filter medium and second lengths of the wire pass through second spaces between layers or sections of the bent or corrugated filter medium different from the first spaces, and placing the bent wire in the bent or corrugated filter medium so that the first lengths of the wire pass through first spaces and the second lengths of the wire pass through the second spaces. In such a configuration, the wire is flexible, and one end or side of the wire can be easily pulled away from the filter medium to facilitate placement of each of the first and second lengths of the wire into open (e.g., unfolded) parts on opposite sides or ends of the filter medium.

In a further embodiment, a first section of the wire may be bent into a first repeating bent shape similar to the bent or corrugated filter medium so that lengths of the first section of the wire pass through alternating spaces (e.g., every other space) between layers or sections of the bent or corrugated filter medium, and a second section of the wire may be bent into a second repeating bent shape substantially similar or identical to the first section so that lengths of the second section of the wire pass through alternating spaces between layers or sections of the bent or corrugated filter medium. The bent first and second sections of the wire may be placed in different spaces in the bent or corrugated filter medium (e.g., the first section in first spaces, and the second section in second spaces different from the first spaces). One end of each of the first and second sections of the wire may be joined together to make an electrical connection (e.g., by soldering, inserting into a conventional wire connector, etc.), and opposite ends of the first and second sections of the wire may be connected to the electrodes.

As disclosed above, the heating element may comprise a metal wire or mesh, with an insulator encapsulation thereon. In one or more embodiments, the insulator may be applied to the metal wire or mesh as a composite paint (i.e., including the insulting material) at an appropriate thickness (e.g., 0.2-3 mm), for example, by dipping, spraying, coating, etc.

In other or further embodiments, the method may further comprise applying the adhesive or sealant to one or more (preferably, two or more, or all) inner surfaces of the outer frame, and the filter medium and the heating element may be affixed to the outer frame by contacting them to the applied adhesive or sealant. Sections of the outer frame may be affixed to each other by applying the adhesive or sealant to edges of the outer frame (e.g., along the width dimension of the outer frame sections). Alternatively, the outer frame sections may be conventionally joined to each other (e.g., with brackets, tape, plastic molding, etc.).

In various embodiments, the method of making an air filter further comprises placing one or more comb supports (e.g., the card comb[s] 6) onto the folded filter medium. For example, a plurality of comb supports may be placed onto each of two opposite sides or ends of the folded filter medium, so that a unique fold of the folded filter medium is between adjacent teeth or fingers of a corresponding comb support. The comb support(s) may be placed onto the folded filter medium manually or mechanically (e.g., using a comb placement machine), either before or after the filter medium and the heating element are fixed to the outer frame.

Other aspects of the method of making (such as the method of making an air purification device) are described elsewhere herein, or are conventional, or can be derived by those skilled in the art without undue experimentation.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A heatable air filter, comprising:
   a) an outer frame;
   b) at least two electrodes passing through the outer frame;
   c) a folded filter medium in the outer frame, the folded filter medium having a plurality of folds and a continuous right-angle bending or folding structure in which each of the plurality of folds is at a right angle, first consecutive ones of the plurality of folds at a same side of the folded filter medium fold in a same direction, second consecutive ones of the plurality of folds at opposite sides of the folded filter medium fold in opposite directions, and adjacent layers of the folded filter medium define a space between the adjacent layers; and
   d) a heating element passing through at least alternating ones of the spaces between the adjacent layers of the filter medium and electrically connected to the electrodes.

2. The air filter of claim 1, wherein the air filter is baffleless.

3. The air filter of claim 1, wherein the heating element comprises an electrically conductive material, covered with an insulating material selected from a polyurethane, a polyesterimide, a polyamide, and combinations thereof.

4. The air filter of claim 1, wherein the heating element comprises a metal wire or mesh having a resistivity of $10^{-9}$-$10^{-5}$ Ohm·m, and comprising copper, aluminum, nickel, zinc, iron, or an alloy thereof.

5. The air filter of claim 1, further comprising a plurality of comb supports in contact with the filter medium, configured to mechanically support the filter medium.

6. The air filter of claim 5, wherein the comb support comprises a spine substantially outside the filter medium, and a plurality of fingers, each in a corresponding space between adjacent folds of the filter medium.

7. The air filter of claim 6, comprising a plurality of the comb supports on both an air inlet side and an air outlet side of the filter medium.

8. The air filter of claim 5, wherein the comb support comprises a thermally- resistant plastic or a metal coated with an insulating material.

9. The air filter of claim 1, wherein the filter medium comprises a fiberglass sheet.

10. The air filter of claim 1, wherein the outer frame has (i) a cuboid shape and a length of 10-10000 mm, a width of 10-10000 mm, and a depth or thickness of 10-350mm, or (ii) a cylindrical shape with an internal diameter of 50-1000 mm, a wall thickness of 10-100 mm, and a length or height of 20-1000 mm.

11. The air filter of claim 1, further comprising an adhesive or sealant on an inner surface of the outer frame, configured to secure (i) the filter medium to the outer frame and (ii) a position of the heating element in the filter medium.

12. The air filter of claim 11, comprising the adhesive or sealant on a plurality of inner surfaces of the outer frame, wherein the adhesive or sealant comprises a thermally-resistant silicone or epoxy.

13. An air purifier, comprising:
   a) the air filter of claim 1;
   b) a controller, configured to provide power to and control heating of the heating element; and
   c) a power supply conduit in electrical communication with the controller and/or the electrodes.

14. The air purifier of claim 13, further comprising one or more fans or pumps configured to draw air through the filter medium.

15. The air purifier of claim 14, further comprising a housing enclosing the air filter, the controller, and the fan or pump.

16. A mobile air purifier, comprising:
   a) the air purifier of claim 15,
   b) three or more wheels or casters affixed to the housing, configured to enable wheeled movement of the housing; and
   c) one or more handles on or in the housing.

17. The air filter of claim 1, wherein the opposite sides of the folded filter medium are a front side and a back side, relative to passage of air through the folded filter medium.

18. A method of purifying air, comprising:
a) heating a heating element passing through a folded filter medium in an air filter, the folded filter medium having a plurality of folds and a continuous right-angle bending or folding structure in which each of the plurality of folds is at a right angle, first consecutive ones of the plurality of folds at a same side of the folded filter medium fold in a same direction, second consecutive ones of the plurality of folds at opposite sides of the folded filter medium fold in opposite directions, and adjacent layers of the folded filter medium define a space between the adjacent layers, the air filter further comprising (i) an outer frame encompassing and supporting the heating element and the filter medium, and (ii) at least two electrodes passing through the outer frame, wherein the heating element passes through at least alternating ones of the spaces between the adjacent layers of the filter medium and is electrically connected to the electrodes; and
b) drawing air through the heated filter medium.

19. The method of claim 18, further comprising (i) determining a temperature in the air filter, and (ii) controlling an amount of energy provided to the heating element to maintain the temperature in the air filter at or near a target temperature.

20. A method of making a heatable air filter, comprising:
a) placing a heating element in a folded filter medium, the folded filter medium having a plurality of folds and a continuous right-angle bending or folding structure in which each of the plurality of folds is at a right angle, first consecutive ones of the plurality of folds at a same side of the folded filter medium fold in a same direction, second consecutive ones of the plurality of folds at opposite sides of the folded filter medium fold in opposite directions, and adjacent layers of the folded filter medium define a space between the adjacent layers, the heating element passing through at least alternating ones of the spaces between the adjacent layers of the filter medium;
b) placing at least two electrodes through an outer frame;
c) electrically connecting the heating element to the electrodes; and
d) affixing the filter medium and/or the heating element to the outer frame using an adhesive or sealant.

\* \* \* \* \*